United States Patent [19]

Azad

[11] Patent Number: 4,782,495
[45] Date of Patent: Nov. 1, 1988

[54] REFLECTOR DESIGN FOR A SLAB LASER

[75] Inventor: Farzin H. Azad, Clifton Park, N.Y.

[73] Assignee: General Electric Company, Schenectady, N.Y.

[21] Appl. No.: 135,952

[22] Filed: Dec. 21, 1987

[51] Int. Cl.$^4$ .......................... H01S 3/093; H01S 3/16
[52] U.S. Cl. ........................................ 372/99; 372/35; 372/66; 372/72
[58] Field of Search ................ 372/99, 33, 34, 35, 372/66, 69-72, 92; 350/413

[56] References Cited

U.S. PATENT DOCUMENTS

| | | | |
|---|---|---|---|
| 3,628,180 | 12/1971 | Segre | 372/33 |
| 3,646,474 | 2/1972 | Segre | 372/66 |
| 3,700,423 | 10/1972 | Kantorski | 372/33 |
| 3,798,571 | 3/1979 | Segre | 372/33 |
| 4,506,369 | 3/1985 | Houston | 372/72 |
| 4,641,315 | 2/1987 | Draggoo | 372/99 |
| 4,682,338 | 7/1987 | Kuppenheimer, Jr. | 372/99 |
| 4,740,983 | 4/1988 | Azad | 372/99 |

Primary Examiner—William L. Sikes
Assistant Examiner—Xuan T. Vo
Attorney, Agent, or Firm—Paul R. Webb, II; James C. Davis, Jr.

[57] ABSTRACT

Two different reflector designs for use in an optically pumped, fluid cooled slab laser are disclosed. Each reflector design is effective to introduce a positive focal power lens effect into a central portion of the lasing medium width that is approximately equal in magnitude to a negative lens effect experienced in lateral edge portions of the lasing medium.

2 Claims, 11 Drawing Sheets

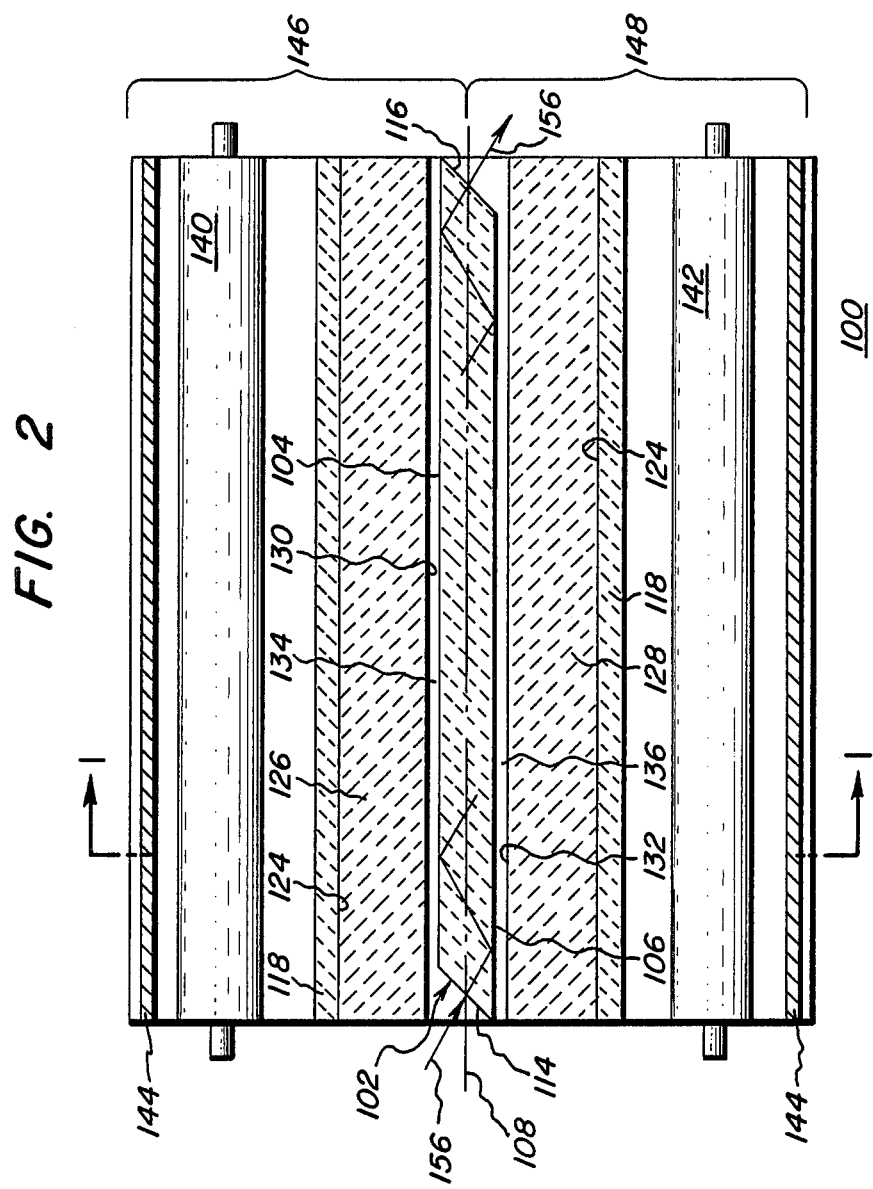

REFLECTOR DESIGN FOR A SLAB LASER

The invention relates in general to slab lasers and, more specifically, to fluid cooled slab lasers.

BACKGROUND OF THE INVENTION

A typical optically pumped, fluid cooled slab laser includes a slab of solid state lasing medium. Pumping means such as a lamp and reflector are situated to impinge optical radiation on the lasing medium in order to pump the atoms in the lasing medium to a metastable state. A cooling fluid is flowed across at least a portion of the lasing medium to remove heat generated therein by the optical pumping. A laser beam is subsequently produced by passing a beam of coherent light, either externally generated or stimulated within the lasing medium, oscillatingly through the lasing medium, the coherent light beam being amplified with each pass through the medium.

Such slab lasers typically exhibit both width-wise and thickness-wise wave-front distortions of the laser beam, the width-wise distortion being particularly prominent in areas proximate lateral edges of the lasing medium. This wave-front distortion diminishes the useable area of the lasing medium, the operating efficiency of the slab laser and the beam quality of the laser beam. Such wave-front distortion is mainly attributable to three known phenomena: (1) width-wise variation of the refractive index of the lasing medium caused by thermal gradients within the lasing medium, i.e. thermal lensing; (2) variations in the refractive index of the lasing medium due to a stress-optic effect caused by a nonuniform stress field in the lasing medium; and (3) beam distortion induced by a deformation of major faces of the lasing medium, caused by thermal expansion and compatibility requirement for a lasing medium of finite rectangular cross-section.

Commonly assigned U.S. Pat. No. 3,633,126 entitled "Multiple Internal Reflection Face-Pumped Laser" (Martin et al.), incorporated in its entirety herein by reference, addresses the problem of thickness-wise variation of the refractive index of the lasing medium. In Martin et al., the beam of coherent light is introduced into the lasing medium in an off-axial direction, such that each ray in the beam is multiply, internally reflected in the thickness dimension through regions of varying refractive indexes during each pass through the lasing medium. The varying refractive indexes encountered in the lasing medium thickness dimension and their distortional effects on the beam are thereby minimized.

U.S. patent No. (allowed U.S. patent application Ser. No. 914,431) entitled "Method and Apparatus For Compensating For Wave Front Distortion in a Slab Laser" (Azad) of common assignment and inventorship, which is incorpoated in its entirety herein by reference, addresses the problem of width-wise wave-front distortion. It is observed that the lasing medium exhibits a negative focal power lens effect in lateral edge portions in the width dimension thereof. The invention disclosed therein is directed to apparatus and method for introducing a positive focal power lens effect, approximately equal in magnitude to the negative focal power lens effect, into a central portion of the lasing medium width. Then, the coherent light beam is passed at least twice through the lasing medium and generally along a longitudinally extending lasing axis of the medium such that the rays of the coherent beam wavefront traverse alternate regions of positive and negative focal powers of equal magnitude. In this manner, the wave-front distortion due to variations in refractive index in the lasing medium width dimension are minimized.

The positive focal power lens effect disclosed in the Azad patent is created by shaping the reflector surrounding the pumping means so as to direct greater pumping energy into the central portion of the lasing medium width. The reflector shape is calculated to only apportion an additional amount of pumping energy to the lasing medium central portion sufficient to create a positive focal power lens effect approximately equal in magnitude to the negative focal power lens effect experienced at the lateral edge portions of the lasing medium. A method for computing a reflector shape suitable for accomplishing this end is disclosed in the above-incorporated U.S. patent No. [allowed U.S. patent application Ser. No. 914,431] to Azad and in commonly assigned copending U.S. patent application Ser. No. [914,431, 10/03/86]. The present invention is directed to specific reflector shapes effective to introduce the appropriate positive lens effect into the lasing medium central portion.

SUMMARY OF THE INVENTION

A principal object of the present invention is to provide specific reflector shapes for use in a face pumped, fluid cooled slab laser so as to achieve specific corresponding desired focal power lens effects in which a positive lens effect introduced into a central portion of the lasing medium approximately equals the magnitude of a negative lens effect experienced in lateral edge portions of the lasing medium.

Accordingly, there are provided a first and a second reflector shape respectively constructed in accordance with first and second illustrated embodiments of the present invention. Each reflector is adapted for use in a slab laser including a solid-state yttrium aluminum garnet lasing medium having a generally rectangular shape and cross section. The lasing medium has first and second opposing major face surfaces disposed parallel to each other and to a longitudinal axis extending through a center of the lasing medium rectangular cross section. A first axis intersects the longitudinal axis at a lasing medium cross section center point and substantially bisects a thickness of the lasing medium rectangular cross section. A second axis intersects the lasing medium cross section center point and bisects a width of the lasing medium rectangular cross section. The slab laser includes a first and a second tubular krypton flash lamp respectively disposed adjacent the first and second lasing medium face surfaces for impinging electromagnetic radiation thereon. A longitudinal lamp axis of each first and second flash lamp is parallel to the lasing medium longitudinal axis and intersects the second axis at points equidistant from the lasing medium cross section center point on opposite sides thereof. The lasing medium is positioned within an annular optically clear support tube coaxial with the lasing medium longitudinal axis such that a center of curvature of both an inside surface and an outside surface of the support tube is located at the lasing medium cross section center point. A first and a second optically clear filler each have a curved surface that generally conforms to the support tube inside surface and a substantially flat surface. The first and second fillers are positioned within the support tube with their flat surfaces respectively parallel to the lasing medium first and second major surfaces, the curved surface of each first and second filler being fastened to the support tube inside surface. A first cooling fluid channel is defined between the first filler flat surface and the lasing medium first major surface, a second cooling fluid channel being defined between the second filler flat surface and the lasing medium second major surface. A first and a second optically clear lasing medium support are respectively positioned between a first and a second side surface of the lasing medium and the support tube inside surface. The first and second flash lamps are respectively coaxially positioned within a first and a second flow tube to form a flash lamp cooling fluid channel between a flash lamp outer surface and a flow tube inner surface.

The reflector surrounds the first and second flow tubes and the support tube. An inside surface of the reflector has a shape effective to introduce a positive focal power lens effect into a central portion of the lasing medium width, the positive lens effect having a magnitude approximately equal to a negative focal power lens effect experienced in lateral edge portions of the lasing medium. A cross section of the slab laser including the reflector inside surface is symmetrical about each first and second axis. The lasing medium rectangular cross section has a width of 0.984±0.004 inches and a thickness of 0.244±0.002 inches. The first and second fillers each have a thickness dimension of 0.424+0.000/−0.005 inches extending from its flat surface to its curved surface along the second axis. The first and second supports each have a thickness dimension substantially equal to that of said lasing medium and a width dimension of 0.122±0.002 inches measured along the first axis. An inside and an outside diameter dimension of the support tube is respectively 1.252±0.002 inches and 1.442±0.002 inches. The central axis of each flash lamp is 1.230±0.005 inches from the lasing medium cross section center point as measured along the second axis. A cross section of each flash lamp has a nominal outside diameter and wall thickness of 10.0 mm and 1.0 mm respectively. The first and second flow tubes each respectively having an inside and an outside diameter of 0.496±0.001 inches and 0.591±0.010/−0.000 inches.

With respect to the reflector of the first embodiment of the present invention, the cross section of the reflector inside surface in a first quandrant of the slab laser cross section comprises a plurality of reflector shape segments each having a start point and an end point. A first reflector shape segment is a straight line having a start point at a radial distance of 0.761±0.005 inches from the lasing medium cross section center point along the first axis and an end point at a radial distance of 1.205±0.005 inches from the lasing medium cross section center point measured at an angle of 50.864° relative to the first axis. A second reflector shape segment is a straight line having a start point coincident with the end point of the first shape segment and an end point at a radial distance of 1.423±0.005 inches from the lasing medium cross section center point measured at an angle of 58.000° relative to the first axis. A third reflector shape segment is a straight line having a start point coincident with the end point of the second shape segment and an end point at a radial distance of 1.514±0.005 inches from the lasing medium cross section center point measured at an angle of 64.500° relative to the first axis. A fourth reflector shape segment is a straight line having a start point coincident with the end point of the third shape segment and an end point at a radial distance of 1.649±0.005 inches from the lasing medium cross section center point measured at an angle of 72.500° relative to the first axis. A fifth reflector shape segment is a straight line having a start point coincident with the end point of the fourth shape segment and an end point at a radial distance of 1.621±0.005 inches from the lasing medium cross section center point measured at an angle of 80.800° relative to the first axis. A sixth reflector shape segment is a straight line having a start point coincident with the end point of the fifth shape segment and an end point at a radial distance of 1.565±0.005 inches from the lasing medium cross section center point measured at an angle of 90.000° relative to the first axis. It is noted that each angle measured relative to the first axis has a tolerance that is a function of the corresponding radial distance from the lasing medium cross section center point.

With respect to the reflector of the second embodiment of the present invention, the cross section of the reflector inside surface in a first quandrant of the slab laser cross section comprises a plurality of reflector shape segments each having a start point and an end point. A first reflector shape segment is a straight, line having a start point at a radial distance of 0.762±0.005 inches from the lasing medium cross section center point along the first axis and an end point at a radial distance of 0.883±0.005 inches from the lasing medium cross section center point measured at an angle of 15.479° relative to the first axis. A second reflector shape segment is a straight line having a start point coincident with the end point of the first shape segment and an end point at a radial distance of 1.069±0.005 inches from the lasing medium cross section center point measured at an angle of 34.088° relative to the first axis. A third reflector shape segment is a straight line having a start point coincident with the end point of the second shape segment and an end point at a radial distance of 1.245±0.005 inches from the lasing medium cross section center point measured at an angle of 47.247° relative to the first axis. A fourth reflector shape segment is a straight line having a start point coincident with the end point of the third shape segment and an end point at a radial distance of 1.494±0.005 inches from the lasing medium cross section center point measured at an angle of 55.341° relative to the first axis. A fifth reflector shape segment is a circular arc having a start point coincident with the end point of the fourth segment and a fifth segment center of curvature located on the second axis at a distance of 0.914±0.005 inches from the lasing medium cross section center point, the fifth segment radius of curvature being 0.906±0.005 inches. An end point of the fifth segment occurs at an angle of 45.000° measured from the fifth segment curvature center relative to a third axis extending from the last recited center and parallel to the first axis. A sixth reflector shape segment is a circular arc having a start point coincident with the end point of the fifth segment and a sixth segment center of curvature located at a distance 0.315±0.005 inches measured along the first axis and a distance of 1.229±0.005 inches measured along the second axis. A sixth segment radius of curvature is 0.461±0.005 inches and an end point of the sixth segment occurs at the second axis. Each angle has a tolerance that is a function of its corresponding radial distance.

BRIEF DESCRIPTION OF THE DRAWINGS

While the specification concludes with claims defining the features of the invention that are regarded as novel, it is believed that the invention together with further objects thereof, will be better understood from a consideration of the following description in conjunction with the drawing figures, in which:

FIG. 2 is section 2—2 of the laser apparatus illustrated in FIG. 1;

DESCRIPTION OF THE INVENTION

Figure 1:
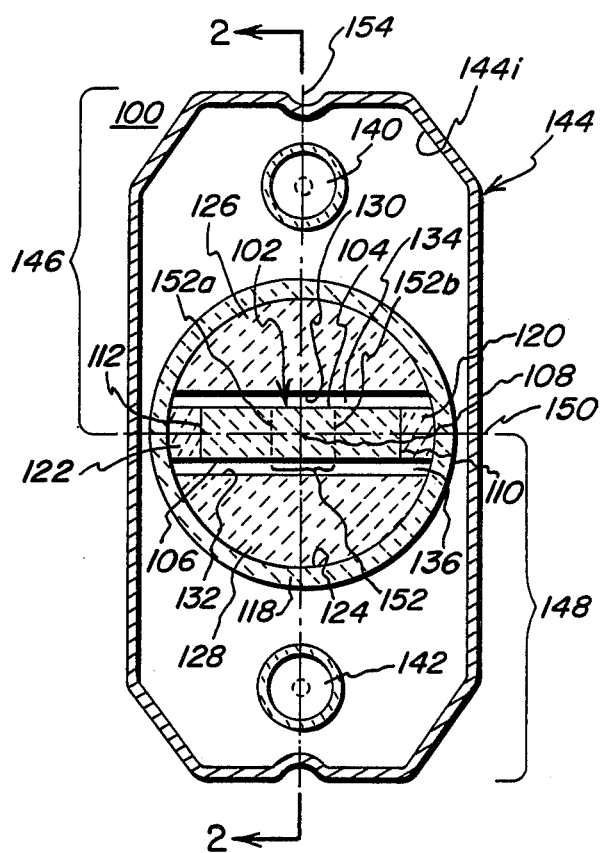
FIG. 1 is a sectional view of slab laser apparatus and is section 1—1 of FIG. 2.

Referring now to the drawings, FIGS. 1 and 2 illustrate an optically pumped, fluid cooled slab laser apparatus 100 comprising a generally rectangular lasing medium slab 102 of lasing material. FIG. 1 is a sectional view of the slab as positioned in laser apparatus 100. FIG. 2 is section 2—2 shown in FIG. 1 and thereby illustrates a side view of slab 102 as positioned in the laser apparatus. As can be further seen, the sectional view in FIG. 1 is section 1—1 of FIG. 2. Lasing medium 102 has a generally rectangular shape and comprises a homogeneous body of solid-state lasing material such as yttrium aluminum garnet (YAG) or neodymium doped silicate (or phosphate) glass. Lasing medium 102 includes a pair of opposing major face surfaces 104 and 106 disposed parallel to each other and to a longitudinally extending lasing axis 108 that extends through the center of the generally rectangular lasing medium cross section. Face surfaces 104 and 106 are polished to optical flatness, i.e. to within about one-eighth of the wavelength of the coherent light emitted by lasing medium 102. A pair of lateral side surfaces 110 and 112 are disposed generally perpendicular to face surfaces 104 and 106 and parallel to axis 108. Side surfaces 110,112 are polished to be sufficiently optically clear so as not to interfere with the optical pumping of the lasing medium. A pair of mutually parallel end surfaces 114 and 116 are disposed, as is known in the art, at a predetermined angle, e.g. 30°, to lasing axis 108. End surfaces 114,116 are preferably polished to optical flatness.

Lasing medium 102 is situated in an annular support tube 118 extending the length of the lasing medium and substantially coaxially with lasing axis 108. Tube 118 comprises a material that is transparent to optical radiation, for example optically clear glass. A pair of optically clear glass supports 120 and 122 extend between lasing medium side surfaces 110 and 112, respectively, and an inner surface 124 of tube 118, to support the lasing medium in a suspended position within the tube. A pair of optically clear glass fillers 126 and 128 each have a curved surface generally conforming to tube inner surface 124 and are fastened thereto. Each filler 126 and 128 respectively includes a substantially flat glass surface 130 and 132 spaced to be generally parallel from lasing medium face surfaces 104 and 106, respectively. There is thus defined a fluid channel 134 between filler surface 130 and lasing medium face surface 104, and a fluid channel 136 between filler surface 132 and lasing medium face surface 106.

Optical pumping means in the form of tubular lamps 140 and 142 are respectively disposed substantially parallel to, equidistant from and coextensive with face surfaces 104 and 106 of lasing medium 102. Lamps 140,142 are employed to generate optical radiation to optically pump lasing medium 102, each comprising a flash-type lamp for emitting optical radiation at wavelengths suitable for exciting the atoms in lasing medium 102 to a metastable state. For example, xenon flashlamps, which provide a pumping wavelength of between 5,000 and 9,000 angstroms, are suitable for pumping a neodymium doped glass lasing medium. To enhance uniformity of the pumping of lasing medium face surfaces 104 and 106, the radiation emitting portions of lamps 140,142 each extend the entire length of the lasing medium face surface proximate the lamp. Also, as is known in the art, each lamp 140,142 is surrounded by a coaxial flow tube (not shown in FIGS. 1 and 2) to form a flow channel, between the lamp surface and flow tube, through which cooling fluid is flowed during operation of laser apparatus 100.

A reflector 144 surrounds lamps 140,142, tube 118 and lasing medium 102. Reflector 144 preferably comprises a high-reflectivity reflector optimized for use with high intensity lamps, for example a water-cooled copper shroud having a silvered or gold plated interior reflecting surface. Reflector 144 is, for convenience of description, viewed as being composed of two substantially identical U-shaped reflector portions 146 and 148, those two reflector portions meeting at a horizontal axis 150 which intersects axis 108 at a lasing medium cross section center point and bisects the thickness of the lasing medium rectangular cross section. Thus, reflector portion 146 surrounds lamp 140 and directs electromagnetic radiation emitted by that lamp so as to impinge on surface 104 lasing medium 102. Similarly, reflector portion 148 surrounds lamp 142 to direct electromagnetic radiation emitted thereby to impinge on lasing medium surface 106. In accordance with the invention disclosed in U.S. patent No. [allowed U.S. patent application Ser. No. 914,431], an inside surface 144*i* of reflector 144 is shaped such that portions 146 and 148 thereof concentrate a selected quantity of optical radiation into a central portion 152 (FIG. 1) of lasing medium 102. Central portion 152, delineated by dashed lines 152*a* and 152*b*, is substantially centered between side surfaces 110,112 and extends the axial length of lasing medium 102. The selected quantity of optical radiation directed to lasing medium portion 152 by reflector portions 146 and 148 is effective to generate a predetermined quantity of heat therein, and hence a predetermined thermally induced positive lens effect in central portion 152. A vertical axis 154 intersects axis 108 at the lasing medium cross section center point and bisects the width of the lasing medium rectangular cross section. As is more fully described below, the inside surface shape of each U- shaped reflector portion 146,148 is symmetrical about axis 154. As should be apparent from the description hereinabove, the inside surface shape of reflector 144 is also symmetrical about axis 150.

In operation, in a manner described in the Martin et al. patent incorporated hereinabove, lamps 140 and 142 are energized to pump optical radiation into lasing medium 102, and thereby excite the atoms in the lasing medium to a metastable state. A cooling fluid (not shown) is flowed over surface 104 and 106 of lasing medium 102 via channels 134 and 136, respectively. After exciting the atoms in lasing medium 102 to a metastable state, a beam 156 (FIG. 2) of coherent light, generated internally or by another laser device, is oscillatingly passed through lasing medium 102 by multiple internal reflections within the lasing medium in a direction generally along axis 108. Beam 156 is amplified in magnitude during each pass through lasing medium 102. One preferred configuration of optical apparatus which can be used to oscillate and thus amplify beam 156 is illustrated and desribed in the above-incorporated Azad patent. As indicated above, the multiple internal reflection of the beam, disclosed in the above-incorporated Martin et al. patent, is effective to minimize wave-front distortion caused by variations in the refractive index across the lasing medium thickness dimension.

In accordance with the invention disclosed in the above-incorporated patent to Azad, width-wise distortion of the coherent beam wave-front caused by variations in the lasing medium refractive index across the lasing medium width is overcome by creating the positive lens effect in central portion 152. Then, beam 156 is passed through the lasing medium, as described above, at least twice so that on successive passes the beam is respectively alternately routed through negative and positive focal power regions, of approximately equal magnitude, in the lasing medium width. In this manner, the width-wise wave-front distortion effects due to the negative and positive focal power width regions substantially cancel one another and the width-wise distortion of the wave-front is minimized.

Figure 3A:
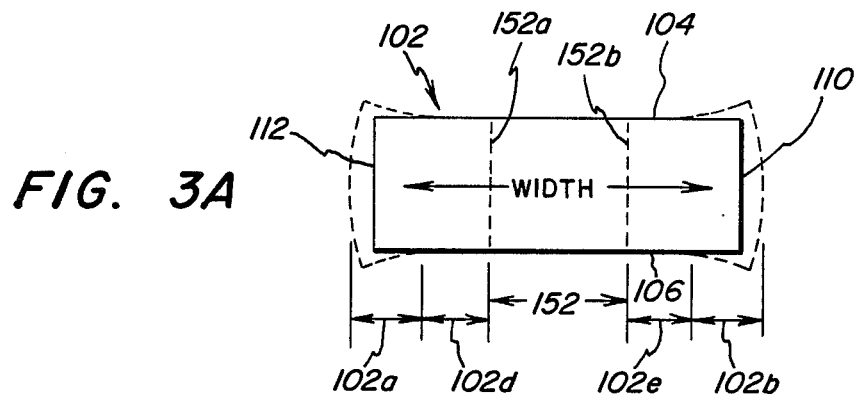
FIGS. 3A, 3B and 3C illustrate a focal power lens effect distribution across the width of the lasing medium of the laser apparatus illustrated in FIGS. 1 and 2.
Figure 3B:
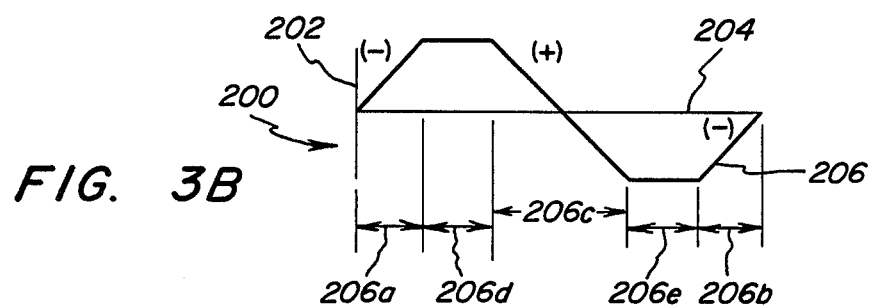

FIG. 3A illustrates lasing medium 102 of laser apparatus 100 (FIGS. 1 and 2), wherein inside surface 144i of reflector 144 has a shape effective to introduce the selected quantity of optical pumping radiation, hence heat, and hence thermally induced positive lens effect into region 152 of the lasing medium. FIG. 3A represents a schematic illustration of lasing medium 102 viewed from the end, including regions 102a and 102b in which deformation of the major faces of the lasing medium, i.e. face surfaces 104,106, has been experienced, the deformation in each of these regions being indicated by dashed lines. FIG. 3B illustrates a graphical illustration 200 having an ordinate axis 202 representing the magnitude of wave-front distortion due to all causes, i.e. thermal lensing, stress-optic effect and major face deformation. Axis 202 may have the units of milliradians. An abscissa axis 204 of plot 200 represents the lateral width of lasing medium 102 between side surfaces 110 and 112. A plot 206 on graph 200 illustrates the various lens effects across the width of lasing medium 102 during operation of laser apparatus 100. Positively and negatively sloped portions of plot 206 respectively represent regions of lasing medium 102 exhibiting negative and positive lens effects, where the magnitude of the slope represents the amount of focal power, in units such as diopters. Horizontal, zero-sloped regions of plot 206 correspond to regions of the lasing medium exhibiting no net lens effect.

As shown by portions 206a and 206b of plot 206, medium 102 exhibits thermal lens effects of negative focal power in regions 102a and 102b approximate side surfaces 112 and 110, respectively, i.e. proximate the lateral edges of the lasing medium. In accordance with the disclosed invention in the Azad patent, reflector inside surface 144i is shaped to introduce sufficient heat into region 152 of the lasing medium to cause that region to exhibit a thermal lens effect of positive focal power, as shown by portion 206c of plot 206. Regions 102d and 102e of lasing medium 102 exhibit no thermal lens effect as shown by horizontal plot portions 206d and 206e, respectively. The positive and negative signs in parentheses further serve to indicate the portions of plot 206 respectively representative of regions of positive and negative focal power.

Figure 3C:
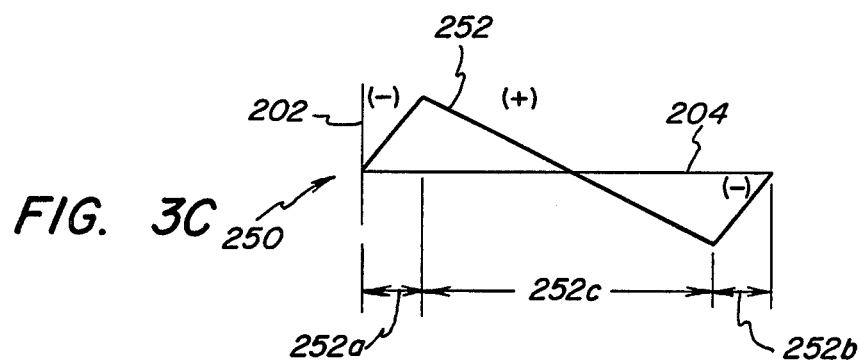

While reflector inside surface 144i may be shaped to cause the positive focal power lens effect in central region 152 isolated from the lateral edge regions where the negative lens effect occurs, the minimization of width-wise wave-front distortion may also be successfully practiced by introducing a positive lens effect into a central portion of the lasing medium defined to extend to the negative lens effect edge regions. FIG. 3C illustrates a graphical illustration 250 having the same ordinate and abscissa axes 202 and 204 as in graph 200 in FIG. 3B. A plot 252 includes portions 252a and 252b that represent the same negative focal power lens effects experienced in regions 102a and 102b of slab 102 proximate side surfaces 112 and 110 respectively, and illustrated in FIGS. 3A and 3B. A portion 252c of plot 252 represents a positive focal power lens effect resulting from the shaping of reflector inside surface 144i to introduce that effect over a central portion of the lasing medium width extending to the negative lens effect regions. As seen in FIGS. 3B and 3C, the slope magnitude of plot portion 252 is less than that of plot portion 206c, indicating that the reflector inside surface shape corresponding to plot 252 causes a smaller magnitude of positive lens effect over a wider portion of the lasing medium width than the reflector shape corresponding to plot 206. Again, positive and negative signs indicate the portions of plot 252 representing positive and negative focal power.

Figure 4A:
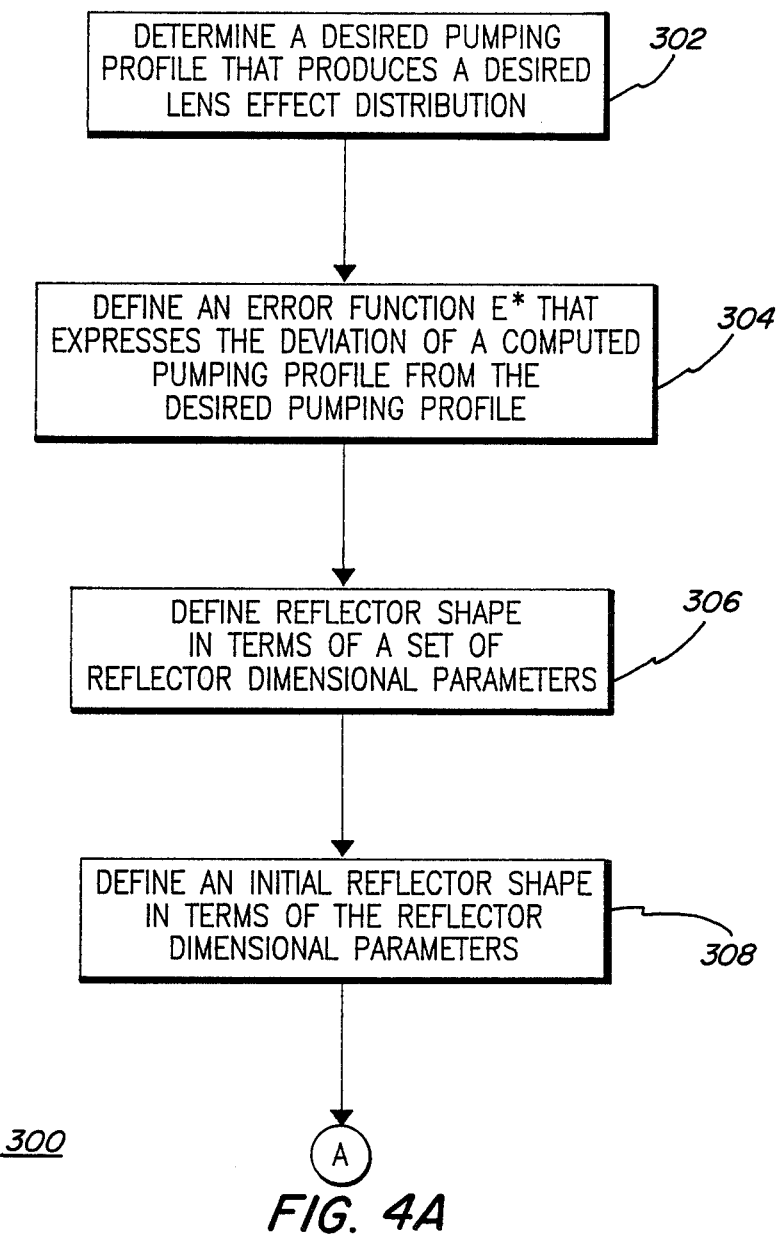
FIGS. 4A and 4B provide a flowchart representation of a preferred reflector shape computation method.
Figure 4B:
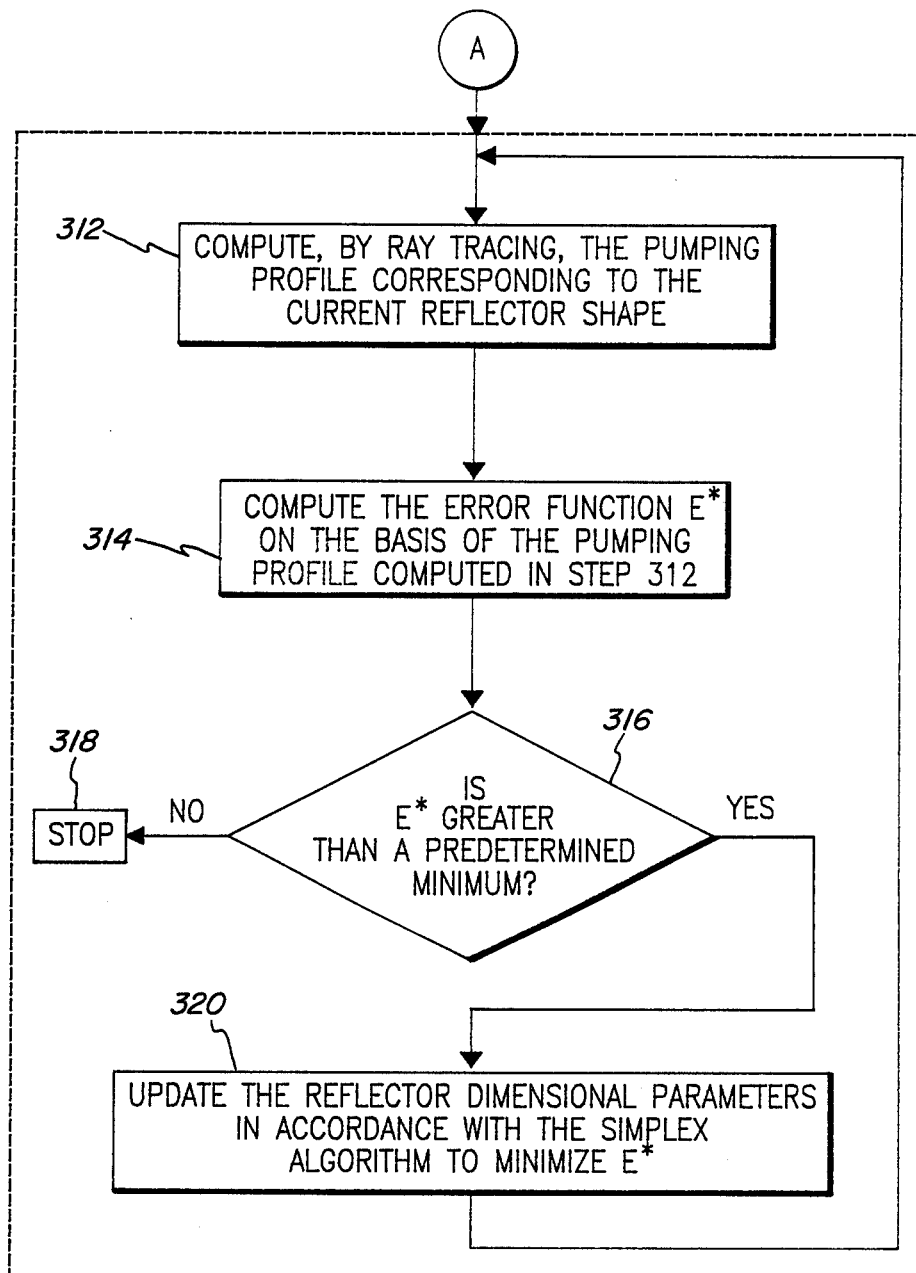

Plots 206 (FIG. 3B) and 252 (FIG. 3C) each represent a different desired focal power lens effect distribution, across the lasing medium width, to be achieved in order to minimize width-wise wave-front distortion in accordance with the invention disclosed in the patent to Azad. A method is next disclosed for computing the shape of reflector inside surface 144i which results in a selected one of the desired lens effect distributions. FIGS. 4A and 4B illustrate a flowchart representation 300 of a preferred form of the method. Referring to FIG. 4A, commencing with an initial step 302, a computation is performed to determine a desired pumping profile across the lasing medium width that results in the desired lens effect distribution. A pumping profile, as used herein and as well known in the art, is a graphical representation of the amount of pumping energy absorbed per unit volume in the lasing medium as a function of position within the medium. With respect to the practice of the present invention, pumping energy absorption is assumed to be uniform longitudinally within the lasing medium, i.e. along longitudinally extending lasing axis 108. As a result of this assumption, a single pumping profile representing the width-wise distribution of volumetric energy absorption would apply at any point along lasing axis 108. It is preferred herein that the volumetric energy absorption at each point along the lasing medium width represents a value averaged over the lasing medium thickness. The amount of energy absorbed in the lasing medium as a function of width position and a model of the slab cooling scheme enables computation of the temperature distribution within the slab. This slab temperature distribution in turn enables computation of the above noted wave-front distorting effect, i.e. thermal lensing, stress-optic effect and major face distortion. The combined effect of the individual wave distorting effects is represented as the focal power lens effect distribution across the lasing medium width. Therefore by an iterative process, a pumping profile that results in the desired lens effect distribution can be determined. Methods for computing the distorting effects from the pumping profile in a face-pumped slab laser are known in the art. One such method is disclosed in "Theoretical and Experimental Studies of Slab Geometry Lasers" by J. M. Eggleston, dissertation submitted for the degree of Doctor of Philosophy, Stanford University, October 1982, reprinted by University Microfilms International of Ann Arbor, Michigan, which is incorporated in its entirety herein by reference.

In the preferred practice of the reflector shape computation method, advantage is taken of the symmetrical configuration of laser apparatus 100, as viewed in FIG. 1, about horizontal axis 150 and vertical axis 154 (FIG. 1), both of which intersect lasing axis 108 at the lasing medium cross section center point. The desired lens effect distribution is assumed to be substantially symmetric about axis 154. As a result, and as more fully described below, the shape of reflector surface 144$i$ is assumed to be symmetric about both axes 150 and 154. It is therefore only necessary to compute the shape for one-quarter of the reflector cross section such as extends between axis 150 and 154.

Figure 5A:
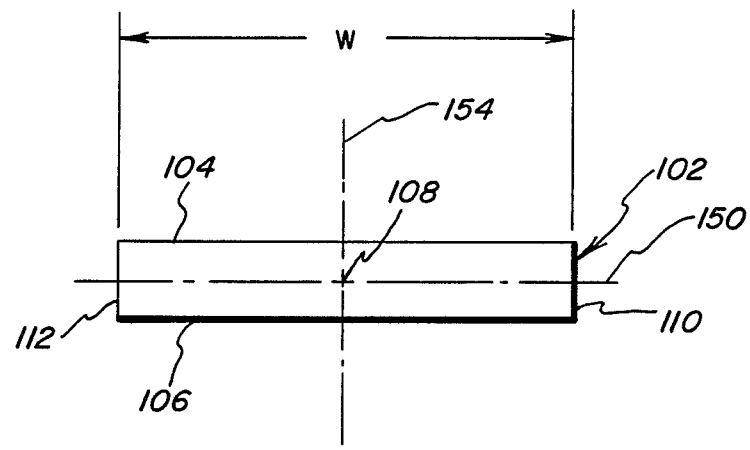
FIGS. 5A, 5B and 5C illustrate exemplary pumping profiles across the width of the lasing medium of the laser apparatus illustrated in FIGS. 1 and 2.
Figure 5B:
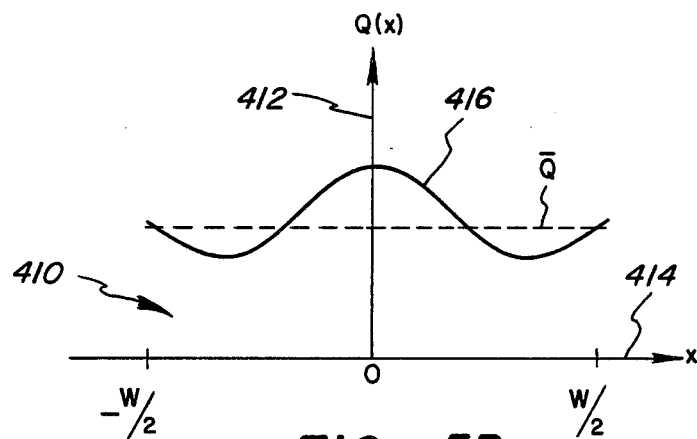

FIG. 5A illustrates any lateral cross section of lasing medium 102, perpendicular to lasing axis 108, with the total width of the lasing medium being indicated as "w". Axes 150 and 154 are also shown in FIG. 5A. FIG. 5B shows a graphical illustration 410 of a desired pumping profile that results in the desired focal power lens effect distribution illustrated in FIG. 3B. Graph 410 has an ordinate axis 412 representing the thickness averaged energy absorption per unit volume $Q(x)$ in lasing medium 102. Axis 412 may have units such as watts/cm$^3$. An abscissa axis 414 of graph 410 represents a position "x" along the width of the lasing medium relative to the center of the lasing medium width. To this end, the ordinate axis is positioned to intersect the abscissa at the point where $x=0$ and is aligned with axis 154. The desired pumping profile is represented as a plot 416 on graph 410 and is seen to be symmetric about $x=0$. The average value of volumetric energy absorption across the lasing medium width is shown in FIG. 5B as $\bar{Q}$.

Figure 5C:
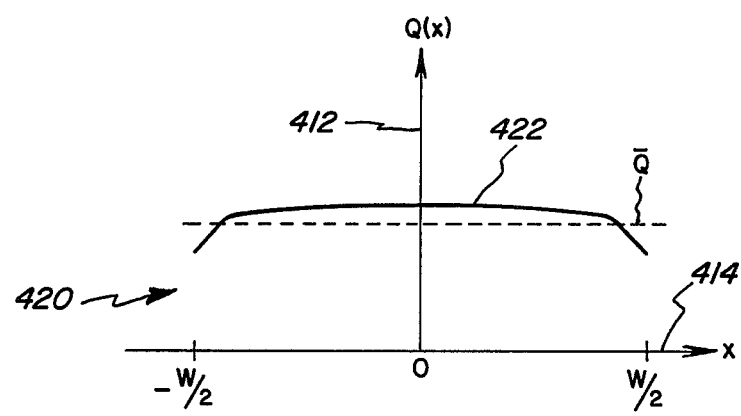

FIG. 5C shows a graphical illustration 420 of a desired pumping profile that results in the desired lens effect distribution illustrated in FIG. 3C. Graph 420 has the same abscissa (414) and ordinate (412) axes as in graph 410. The desired pumping profile is represented as a plot 422 on graph 420.

Referring again to FIG. 4A, the method next proceeds to a step 304 in which an error function E* is defined to express the deviation of a computed pumping profile from the desired pumping profile. The error function is defined with respect to the pumping profile illustrated in FIG. 5B, it being understood that the defined error function is equally applicable to any desired pumping profile including the profile illustrated in FIG. 5C. Referring to FIG. 5B, it is preferred herein, for computational convenience, to define a relative pumping profile $q(x)$ that is the variation of $Q(x)$ with respect to $\bar{Q}$. That is:

$$q(x) = Q(x)/\bar{Q}.$$

Then, for the computed and desired pumping profiles, the relative pumping profiles are respectively designated $q_C(x)$ and $q_D(x)$. An expression for the deviation of the computed pumping profile from the desired pumping profile is:

$$E(x) = q_C(x) - q_D(x)$$

It is preferred herein to define the error function E* as a sum of squares of the deviation of the computed pumping profile from the desired pumping profile at a plurality of M points $x_i$ uniformly spaced across a predetermined portion of the lasing medium width for which the reflector shape is being determined. To wit:

$$E^* = \sum_{i=1}^{M} E(x_i)^2.$$

In view of the above noted symmetry of the reflector shape about axis 154, the error function is defined for only one-half of the lasing medium width. The number of different values of "$x_i$" over which $E(x_i)^2$ is summed is a matter of design choice. As described hereinbelow, it is preferred herein to model the portion of the lasing medium width under consideration as a plurality of finite width elements. Then, each $x_i$ corresponding to a different width element and each error function value $E(x_i)$ represents the difference between the computed and desired pumping profile values for the width element corresponding to $x_i$.

An alternate definition of the error function that may be used is the maximum of the absolute values of the deviations of the computed pumping profile from the desired pumping profile experienced across the predetermined portion of the lasing medium width:

$$E^* = \text{Max}(|E(x_i)|).$$
$$i = 1, 2, \ldots, M$$

Again, in view of the symmetry of the reflector shape about axis 154, the error function is defined for one-half of the lasing medium width. Having defined E*, it is clear that the object of the method is to determine a reflector shape for which E* is minimized.

Referring again to FIG. 4A, step 306 is next performed in which a set of reflector dimensional parameters are defined to described the reflector shape. Since as indicated above, in consideration of the symmetrical configuration of laser apparatus 100, only one-quarter of the reflector shape need be computed, the set of reflector dimensional parameters is defined for one-quarter of the shape. A sectional view of the one-quarter of the laser apparatus cross section extending between axis 150 and 154 is diagrammatically illustrated in FIG. 6. Elements of the laser apparatus are identified with the same reference numerals as appear in FIG. 1.

For clarity, only interior surface 144i of reflector 144 is shown since the reflector dimensional parameters are defined in terms of that surface. Lamp 140 is shown in greater detail in FIG. 6 and includes, in cross section, a flash lamp tube 500 respectively having inner and outer tube surfaces 500a and 500b and, as previously described, a coaxial flow tube 502 surrounding lamp tube 500 and having inner and outer flow tube surfaces 502a and 502b, respectively. A fluid coolant flow channel 504 is thereby defined between surfaces 500b and 502a. Lamp 140 has a longitudinal axis 506 that is parallel to lasing axis 108 and intersects vertical axis 154. The axis of lamp 140 and the axis of lamp 142 (not shown in FIG. 6) intersect axis 154 at points respectively equidistant from the lasing medium cross section center point. The specific reflector shapes described hereinbelow were computed assuming provision of lamps 140 and 142 as krypton flash lamps manufactured as model #FKQ254-6 by EG&G Co. of Salem, Massachusetts.

Figure 6:
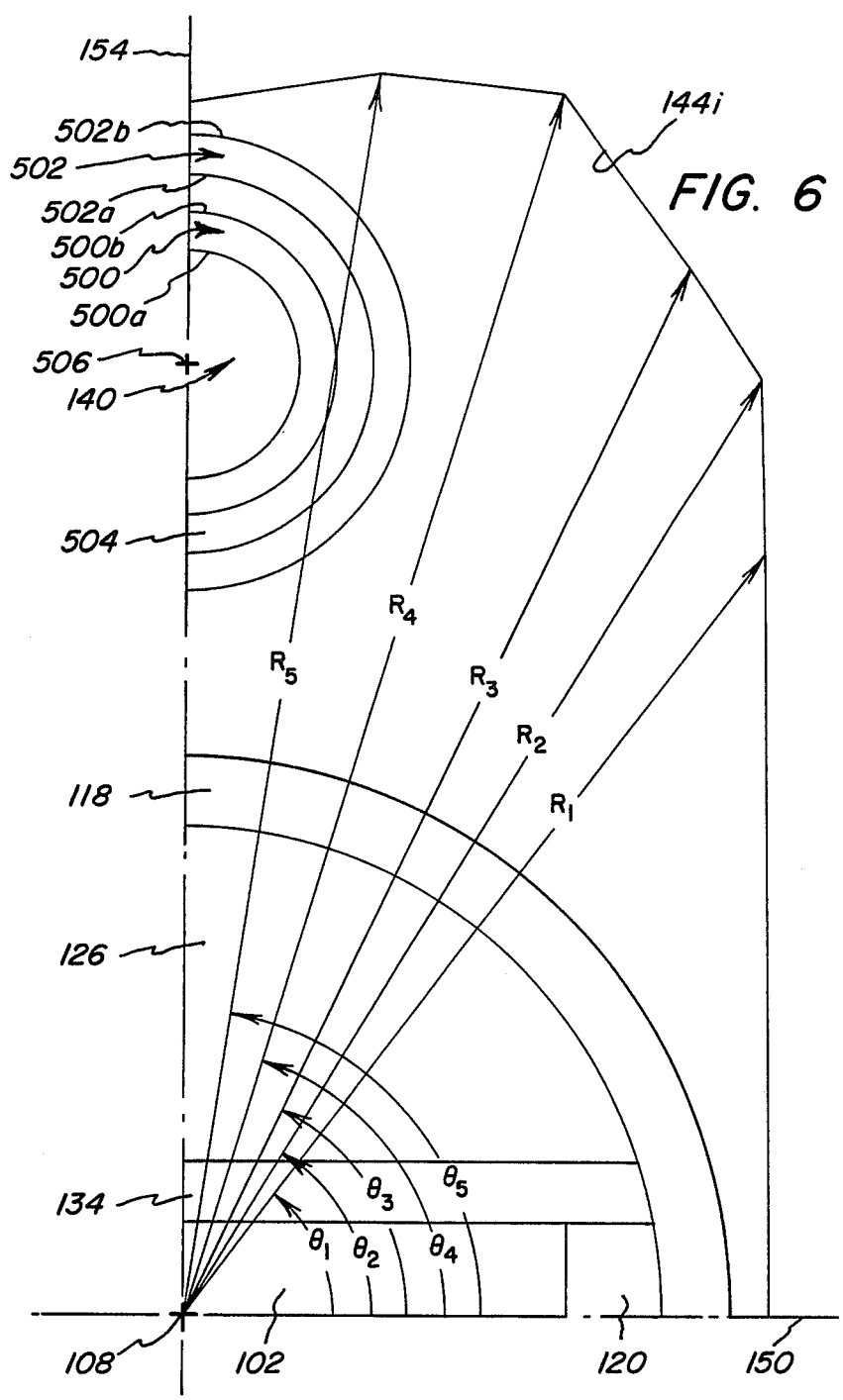
FIG. 6 illustrates exemplary reflector dimensional parameters for use in defining the shape of the laser apparatus reflector.

It is preferred herein to define the reflector dimensional parameters as a plurality of radial distances emanating from the intersection, at axis 108, of axes 150 and 154 and extending to the reflector. Each radial distance is set at a predetermined angle relative to a reference axis such as axis 150. An exemplary set of five dimensional parameters $R_1$ through $R_5$ are shown in FIG. 6 respectively at predetermined angles $\theta_1$ through $\theta_5$ measured relative to axis 150. The points of intersection between the reflector 144 interior surface and axes 150 and 154 can either be fixed or assigned as additional dimensional parameters. The radial distances represented by parameters $R_1$ through $R_5$ all lie in the plane of FIG. 6 which is perpendicular to axis 108. Thus, the dimensional parameters and hence the reflector shape are defined in two dimensions. Since E* is a function of pumping profiles and each computed pumping profile is a function, in part, of the reflector shape, the error function may be stated as a function of the reflector dimensional parameters. For a general case of N dimensional parameters $R_1, R_2, \ldots, R_N$, the error function is $E^*(R_1, R_2, \ldots, R_N)$ and the object of the reflector shape computation method is more succinctly stated to find a set of dimensional parameters $R_1, R_2, \ldots, R_N$ for which $E^*(R_1, R_2, \ldots, R_N)$ is minimized.

Referring again to FIG. 4A, the method proceeds to a step 308 in which an initial "guess" is made at the reflector shape. That is, an initial set of values are assigned to the dimensional parameter set. At any time in the course of practicing the present method, the set of values currently assigned to the dimensional parameters represents a current reflector shape. Thus at this point in the method, the initial guess at the reflector shape represents the current reflector shape. Given the set of initial values assigned to the reflector parameter set, the remaining computational task is to vary these values in a manner effective to minimize E*. This remaining task is illustrated in FIG. 4B, in which flowchart 300 continues, as a step 310. Numerical optimization/minimization techniques known in the art, including the Simplex algorithm preferred herein, are typically structured to optimize/minimize a particular function upon being provided with an initial set of values for the function variables.

Thus, still referring to FIG. 4B and within step 310, the method proceeds to a step 312 in which a pumping profile is computed based on the current reflector shape. This computation is performed by a process of ray tracing. The ray tracing is performed in the one-quarter portion, or quadrant, of the laser apparatus 100 cross section which is illustrated in FIG. 6 and again shown in FIG. 7 for the purpose of illustrating ray tracing as preferably practiced herein. The use of ray tracing to compute the pumping profile in a lasing medium is known in the art. An example of one such use of ray tracing is described in Chapter 4 of the report entitled: "High-Average-Power Solid-State Glass Laser: Design Notes" by W. L. Gagnon et al., published by Lawrence Livermore National Laboratory, August 1986. Chapter 4 of that report describes a ray tracing technique in which the rays are generated at each optical pumping lamp in accordance with a Monte Carlo technique. While the method described herein can be successfully practiced using such a Monte Carlo technique to generate rays, a different ray generation technique is preferred. In the preferred practice of the method, rays are emitted from a predetermined number of points uniformly distributed on the inner surface of the lamp. The selection of a sufficient number of points assures sufficiently accurate ray tracing results. The electromagnetic radiation emitted at each predetermined point on the lamp inner suface is modeled as a fan of rays having a particular spectral composition. A discussion of the theory underlying the lamp emission model employed herein is disclosed in an article entitled: "Radiation Transport" by W. F. Hagen which appears at pages 6-17 through 6-24 in the "Laser Program Annual Report 84" published by Lawrence Livermore National Laboratory, that article being incorporated in its entirety herein by reference. The path of each ray so emitted is eflected and refracted within the one-quarter portion of the laser apparatus 100 cross section and may fall incident on lasing medium 102. The paths of two exemplary rays 552 and 554 are traced in FIG. 7. In the preferred practice of the method, rays are only traced in a two dimensional plane perpendicular to axis 108, e.g. the plane of FIG. 7. Tracing rays in two dimensions to compute the pumping profile is possible due to the above noted assumption of a substantially uniform pumping profile along axis 108.

Figure 7:
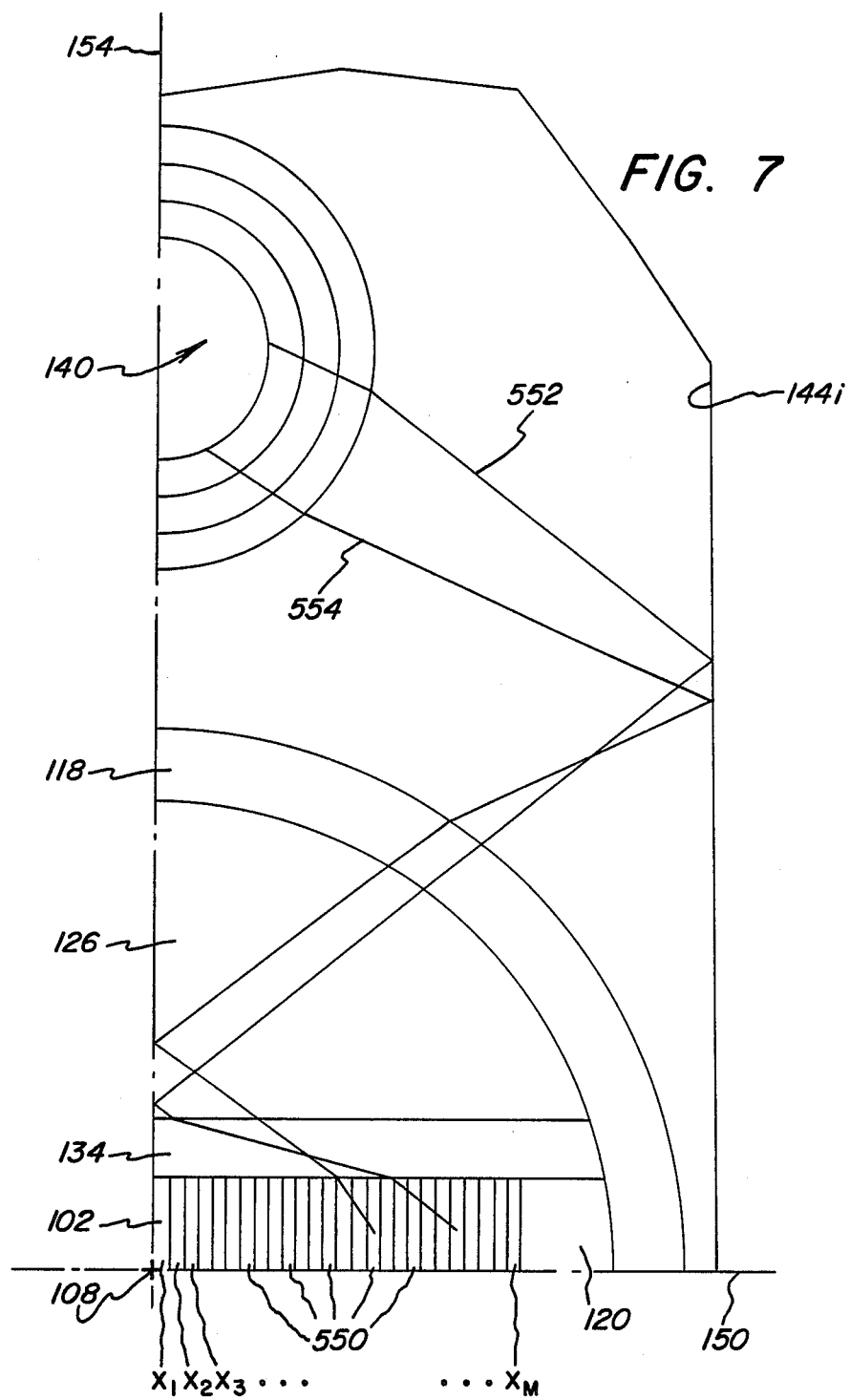
FIG. 7 illustrates a ray tracing technique used to compute a pumping profile in the practice of the preferred reflector shape computation method.

Lasing medium 102 is represented as a finite element model consisting of a plurality of width elements 550. The absorption by each width element 550 of the energy of incident electromagnetic rays is modeled to be spectrally dependent. That is, whether an incident ray is absorbed in the lasing medium and the amount of energy absorbed from the ray are a function of the spectral composition of the particular ray and the spectrally dependent absorptive properties of the lasing medium. In this manner, the amount of energy absorbed in each width element 550 can be summed and a pumping profile computed across the lasing medium width. As noted above, it is preferred herein that each value $x_i$ corresponds to a different one of the width elements of the lasing medium finite element model. Such correspondence between the values of $x_i$ for $i = 1, 2, \ldots, M$ and the width elements is illustrated in FIG. 7. Then, in computing $E(x_i)$, the value of $q_C$ or $q_D$ respectively corresponds to the computed or desired energy bbsorbed in the width element corresponding to $x_i$. It is also noted that due to the symmetry of the laser apparatus 100 cross section about axis 154, rays are assumed to reflect off of axis 154. While such rays would otherwise normally travel across that axis and fall incident on the portion of lasing medium 102 to the left of axis 154, as viewed in FIG. 7, the reflected rays simulate corresponding rays which are emitted by the portion of lamp 140 to the left of axis 154 and cross axis 154 at the points of assumed reflection to follow paths coincident with the reflected rays. It is additionally noted that in the preferred practice of the method, the absorption of energy from each ray as it passes through the various other elements of the laser apparatus, exclusive of the lasing medium, is assumed to be a spectrally averaged absorption and is considered in the overall computation of the pumping profile.

Referring again to FIG. 4B, the method continues to a step 314 in which the error function E* is computed on the basis of the pumping profile computed in step 312. Then at a step 316, the magnitude of E* is compared to a predetermined acceptable minimum value for E* which represents an acceptable correspondence between the computed and desired pumping profiles. If the magnitude of E* is determined to be less than or equal to the acceptable minimum value, the method stops (step 318) and the current reflector shape is determined to be effective to substantially produce the desired lens effect distribution. The phrase "substantially produce" is employed to recognize the small deviation that may exist between the computed and desired pumping profiles as permitted by the acceptable minimum value of E*. If the magnitude of E* is greater than the acceptable minimum value, the method proceeds to a step 320 in which the reflector dimensional parameters are updated in accordance with the particular numerical minimization technique being employed, which in the illustrated embodiment is the Simplex algorithm, that algorithm being well known in the art. With the reflector dimensional parameters so updated to represent the current reflector shape, the method returns to step 312 to repeat steps 312 through 316. The reflector shape computation method preferred herein and described hereinabove has been programmed in the Fortran 77 language and successfully run on a Digital Equipment Corporation VAX 8600 computer.

Figure 8:
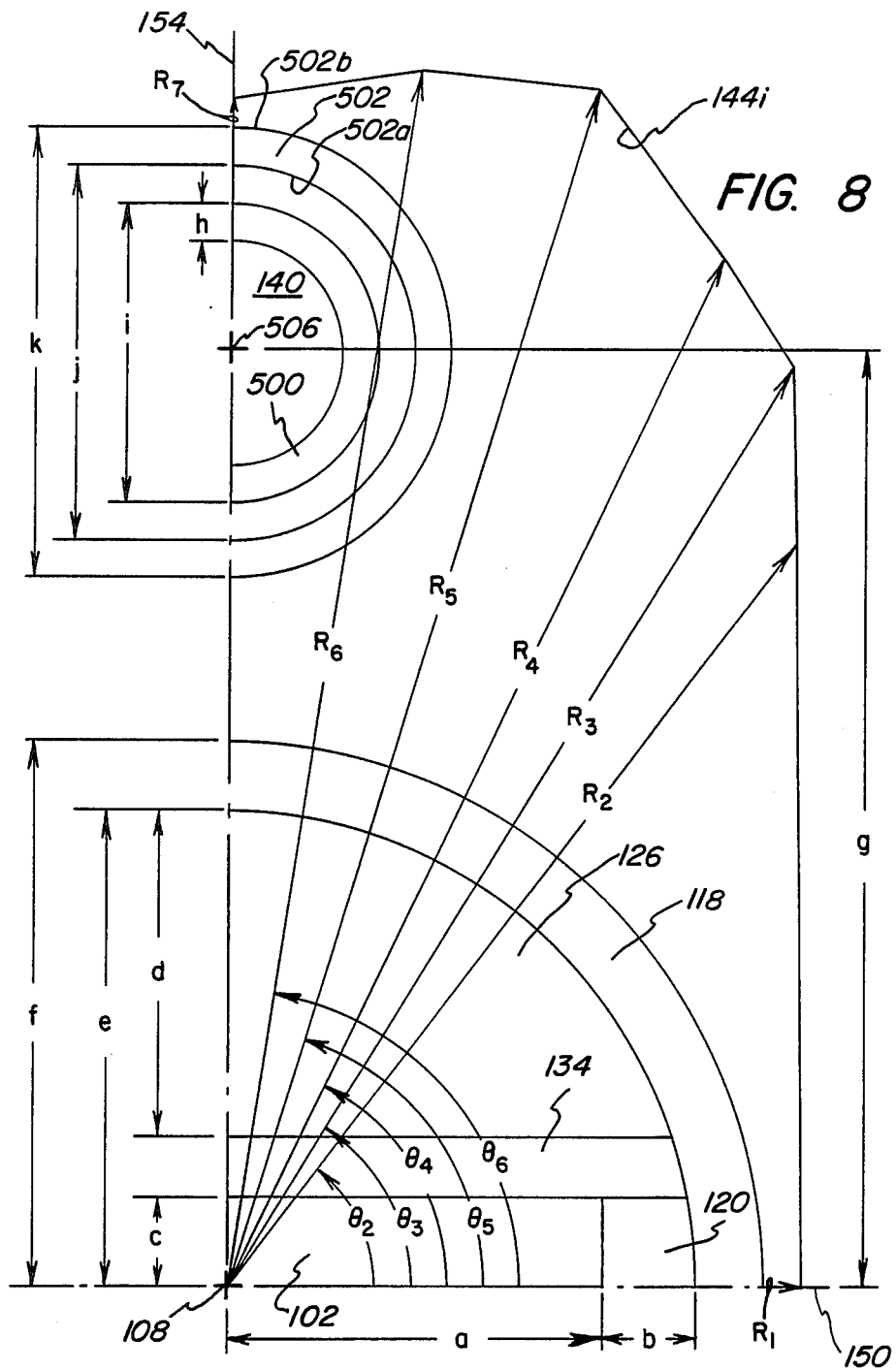
FIG. 8 illustrates the shape of a reflector effective to produce the pumping profile illustrated in FIG. 5B.

FIG. 8 illustrates the quadrant of the laser apparatus cross section illustrated in FIGS. 6 and 7 and includes dimensions of the various elements of a preferred construction of laser apparatus 100. Seven dimensional parameters $R_1$ through $R_7$, at respective predetermined angles $\theta_1$ through $\theta_7$, serve to define a reflector shape of a first embodiment of the present invention effective to produce the desired pumping profile illustrated in FIG. 5B. The dimensions of the various laser apparatus elements exclusive of the reflector are identified in FIG. 8 by the lower case letters a through k. Table I lists the actual dimension and tolerance for each dimension identifying letter for the preferred construction.

TABLE I

| IDENTIFYING LETTER | DIMENSION |
|---|---|
| a | 0.492 ± 0.004 inches |
| b | 0.122 ± 0.002 inches |
| c | 0.118 ± 0.002 inches |
| d | 0.424 + 0.000/−0.005 inches |
| e | 0.626 ± 0.002 inches |
| f | 0.721 ± 0.002 inches |
| g | 1.230 ± 0.005 inches |
| h | 1.0 mm (nominal) |
| i | 10.0 mm (nominal) |
| j | 0.496 ± 0.001 inches |
| k | 0.591 + 0.010/−0.000 inches |

While some dimensions listed in Table I represent only one half the total dimension of an element of laser apparatus 100, e.g. dimension a is only one-half the width of lasing medium 102, dimension c is only one-half the thickness of lasing medium 102, etc., the total dimensions are obtained by doubling the half dimensions. To wit, the full width and thickness of lasing medium 102 are 0.984±0.004 inches and 0.244±0.002 inches, respectively. The full inside and outside diameters of tube 118 are 1.252±0.002 inches and 1.442±0.002 inches, respectively. It is noted that the center of curvature of both inside surface 124 of tube 118 and the outside surface thereof is located at the lasing medium cross section center point.

The values of the dimensional parameters $R_1$ through $R_7$ represent radial distances from the lasing medium cross section center point to inside surface 144i of the reflector and were determined, using the laser apparatus dimensions listed in Table I, by practice of the above described reflector shape computation method. Table II, below, lists the values of $R_1$ through $R_7$ so determined and the fixed angles $\theta_1$ through $\theta_7$, measured relative to axis 150, at which those respective radial distances were determined. It is noted that $\theta_1$ and $\theta_7$, which are respectively 0° and 90°, are not illustrated in FIG. 8.

TABLE II

| REFLECTOR SHAPE ILLUSTRATED IN FIG. 8 ||||
|---|---|---|---|
| $R_i$ | RADIAL DISTANCE (inches) | $\theta_i$ | ANGLE RELATIVE TO AXIS 150 (Degrees) |
| $R_1$ | 0.761 ± 0.005 | $\theta_1$ | 0.000 |
| $R_2$ | 1.205 ± 0.005 | $\theta_2$ | 50.864 |
| $R_3$ | 1.423 ± 0.005 | $\theta_3$ | 58.000 |
| $R_4$ | 1.514 ± 0.005 | $\theta_4$ | 64.500 |
| $R_5$ | 1.649 ± 0.005 | $\theta_5$ | 72.500 |
| $R_6$ | 1.621 ± 0.005 | $\theta_6$ | 80.800 |
| $R_7$ | 1.565 ± 0.005 | $\theta_7$ | 90.000 |

The reflector shape of the first embodiment illustrated in FIG. 8 may be viewed as being composed of six reflector shape segments each being a straight line having a start point at one radial distance from the lasing medium cross section center point and an end point at the next radial distance from the center point. For example, a first reflector shape segment is a straight line having a start point at a radial distance ($R_1$) of 0.761±0.005 inches from the lasing medium cross section center point along axis 150 (since $\theta_1=0.000°$) and an end point at a radial distance ($R_2$) of 1.205±0.005 inches from the lasing medium cross section center point measured at an angle ($\theta_2$) of 50.864° relative to axis 150. As can be seen, the start point of each succeeding reflector shape segment is coincident with the end point of the immediately preceding segment. It is noted that while a tolerance of ±0.005 is indicated in Table I for each radial distance, no tolerance is shown for each fixed angle $\theta_i$. The tolerance of each angle $\theta_i$ represents an arc described by the tip of its corresponding radial distance $R_i$ such that the arc can extend ±0.005 inches. Since the variation in $\theta_i$ resulting in such an arc is dependent on the value of the corresponding radial distance $R_i$, the tolerance of each value $\theta_i$ is simply characterized as being a function of its corresponding radial distance $R_i$.

Figure 9:
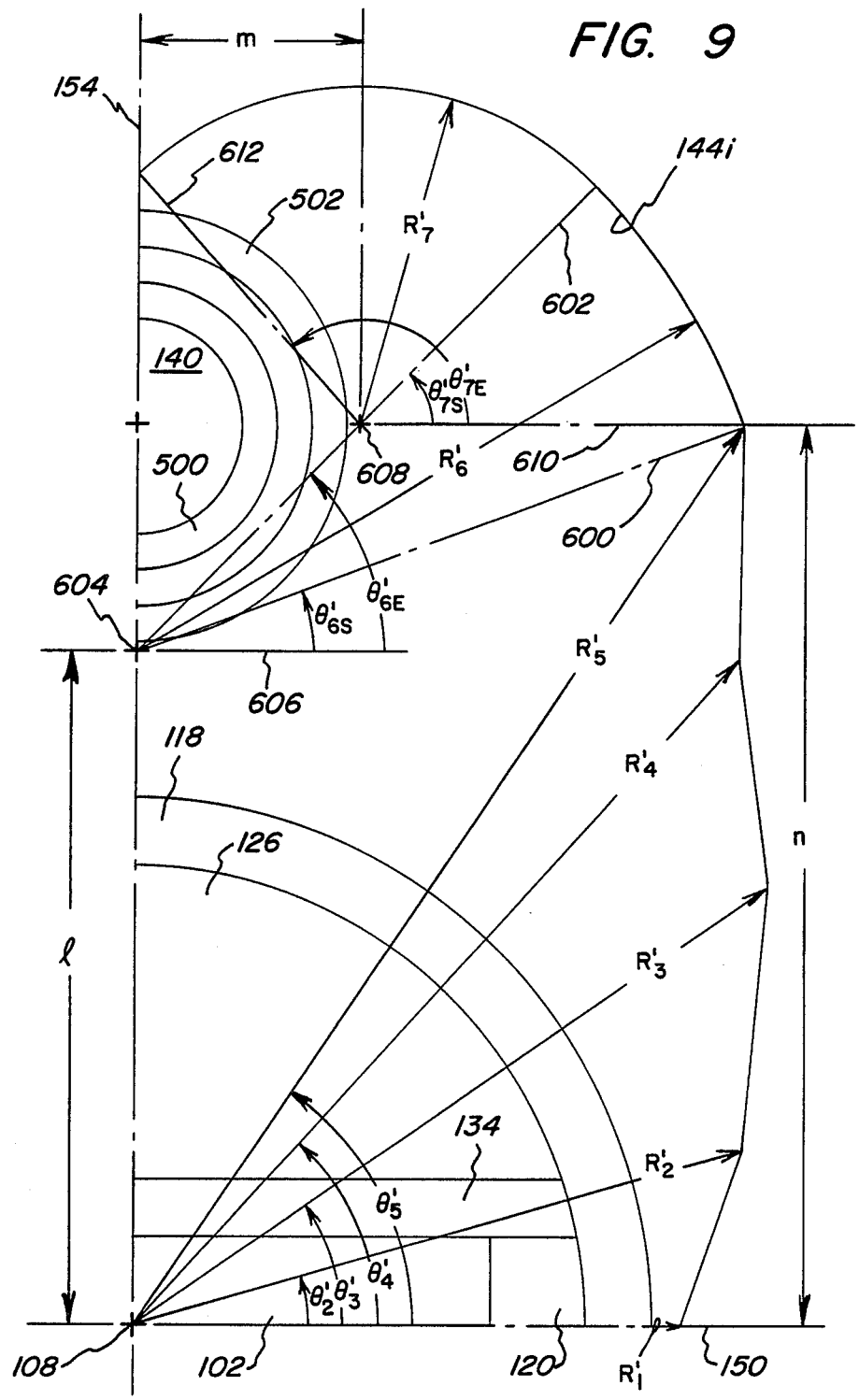
FIG. 9 illustrates the shape of a reflector effective to produce the pumping profile illustrated in FIG. 5C.

FIG. 9 illustrates a reflector shape of a second embodiment of the present invention effective to produce the desired pumping profile illustrated in FIG. 5C. The dimensions of the various elements of laser apparatus 100 are identical to those illustrated in FIG. 8 and are not reproduced in FIG. 9. The reflector shape in FIG. 9 is described by four straight line segments defined by radial distances $R_1'$ through $R_5'$ at respective predetermined angles $\theta_1'$ through $\theta_5'$. A fifth segment is a circular arc commencing at a reference line 600, ending at a reference line 602 and having a radius $R_6'$. The radius of curvature $R_6'$ is measured from a center of curvature 604. Reference line 600 is defined by an angle $\theta'_{6S}$ relative to an axis 606 extending, parallel to axis 150, from center 604. Reference line 602 is defined by an angle $\theta'_{6E}$ relative to axis 606. Center 604 is defined at a distance l from the lasing medium cross center center point along axis 154. A sixth segment of the reflector shape illustrated in FIG. 9 is a circular arc commencing at reference line 602, ending at axis 154 and having a radius $R_7'$. The radius of curvature $R_7'$ is measured from a center of curvature 608. Reference line 602 is offset by an angle $\theta'_{7S}$ (which is equal to $\theta'_{6E}$) relative to an axis 610 extending, parallel to axis 150, from center 608. A reference line 612 extends from center 608 to the intersection between the sixth segment and axis 154. Reference line 612 is defined by an angle $\theta'_{7E}$ measured relative to axis 610. Center 608 is defined at a distance m measured from axis 154 parallel to axis 150 and a distance n measured from axis 150 parallel to axis 154. The values of the various dimensions defining the reflector shape illustrated in FIG. 9 are summarized in Table III below:

TABLE III

REFLECTOR SHAPE ILLUSTRATED IN FIG. 9
l = 0.914 ± 0.005 inches
m = 0.315 ± 0.005 inches
n = 1.229 ± 0.005 inches

| $R'_i$ | RADIAL DISTANCE (inches) | $\theta'_i$ | ANGLE RELATIVE TO AXIS 150 (Degree) |
|---|---|---|---|
| $R'_1$ | 0.762 ± 0.005 | $\theta'_1$ | 0.000 |
| $R'_2$ | 0.883 ± 0.005 | $\theta'_2$ | 15.749 |
| $R'_3$ | 1.069 ± 0.005 | $\theta'_3$ | 34.088 |
| $R'_4$ | 1.245 ± 0.005 | $\theta'_4$ | 47.247 |
| $R'_5$ | 1.494 ± 0.005 | $\theta'_5$ | 55.341 |
| $R'_6$ | 0.906 ± 0.005 | $\theta'_{6S}$ | 20.352 |
|  |  | $\theta'_{6E}$ | 45.000 |
| $R'_7$ | 0.461 ± 0.005 | $\theta'_{7S}$ | 45.000 |
|  |  | $\theta'_{7E}$ | 133.125 |

The tolerance described above with respect to the angles $\theta_i$ illustrated in FIG. 8 and described in Table II are equally applicable to the angles $\theta'_i$ illustrated in FIG. 9 and listed in Table III. While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A reflector for use in a slab laser including a solid-state yttrium aluminum garnet lasing medium having a generally rectangular shape and cross section, said lasing medium having first and second opposing major face surfaces disposed parallel to each other and to a longitudinal axis extending through a center of the lasing medium rectangular cross section, a first axis intersecting said longitudinal axis at a lasing medium cross section center point and substantially bisecting a thickness of the lasing medium rectangular cross section, a second axis intersecting the lasing medium cross section center point and bisecting a width of the lasing medium rectangular cross section, said slab laser including a first and a second tubular krypton flash lamp respectively disposed adjacent said first and second lasing medium major face surfaces for impinging electromagnetic radiation thereon, a longitudinal lamp axis of each said first and second flash lamp being parallel to said lasing medium longitudinal axis and intersecting said second axis at points equidistant from the lasing medium cross section center point on opposite sides thereof, said lasing medium being positioned within an annular optically clear support tube coaxial with said lasing medium longitudinal axis such that a center of curvature of both an inside surface and an outside surface of said support tube is located at the lasing medium cross section center point, a first and a second optically clear filler each having a curved surface generally conforming to said support tube inside surface and a substantially flat surface, said first and second fillers being positioned within said support tube with their flat surfaces respectively parallel to said lasing medium first and second major surfaces, the curved surface of each said first and second filler being fastened to said support tube inside surface, a first cooling fluid channel being defined between said first filler flat surface and said lasing medium first major surface, a second cooling fluid channel being defined between said second filler flat surface and said lasing medium second major surface, a first and a second optically clear lasing medium support being respectively positioned between a first and a second side surface of said lasing medium and said support tube inside surface, said first and second flash lamps respectively being coaxially positioned within a first and a second flow tube to form a flash lamp cooling fluid channel between a flash lamp outer surface and a flow tube inner surface, said reflector surrounding said first and second flow tubes and said support tube, an inside surface of said reflector having a shape effective to introduce a positive focal power lens effect into a central portion of the lasing medium width, the positive lens effect having a magnitude approximately equal to a negative focal power lens effect experienced in lateral edge portions of said lasing medium, a cross section of the slab laser including said reflector inside surface being symmetrical about each said first and second axis, the lasing medium rectangular cross section having a width of 0.984±0.004 inches and a thickness of 0.244±0.002 inches, said first and second fillers each having a thickness dimension of 0.424+0.000/−0.005 inches extending from its flat surface to its curved surface along said second axis, said first and second supports each having a thickness dimension substantially equal to that of said lasing medium and a width dimension of 0.122±0.002 inches as measured along said first axis, an inside and an outside diameter dimension of said support tube respectively being 1.252±0.002 inches and 1.442±0.002 inches, said lamp axis of each said flash lamp being 1.230±0.005 inches from the lasing medium cross section center point as measured along said second axis, a cross section of each said flash lamp having a nominal outside diameter and wall thickness of 10.0 mm and 1.0 mm respectively, said first and second flow tubes each respectively having an inside and an outside diameter of 0.496±0.001 inches and 0.591+0.010/−0.000 inches, the cross section of said reflector inside surface in a first quadrant of the slab laser cross section comprising:

a plurality of reflector shape segments each having a start point and an end point;

a first reflector shape segment being a straight line having a start point at a radial distance of 0.761±0.005 inches from the lasing medium cross section center point along said first axis and an end point at a radial distance of 1.205±0.005 inches from the lasing medium cross section center point measured at an angle of 50.864° relative to said first axis;

a second reflector shape segment being a straight line having a start point coincident with the end point of said first shape segment and an end point at a radial distance of 1.423±0.005 inches from the lasing medium cross section center point measured at an angle of 58.000° relative to said first axis;

a third reflector shape segment being a straight line having a start point coincident with the end point of said second shape segment and an end point at a radial distance of 1.514 ±0.005 inches from the lasing medium cross section center point measured at an angle of 64.500° relative to said first axis;

a fourth reflector shape segment being a straight line having a start point coincident with the end point of said third shape segment and an end point at a radial distance of 1.649±0.005 inches from the lasing medium cross section center point measured at an angle of 72.500° relative to said first axis;

a fifth reflector shape segment being a straight line having a start point coincident with the end point of said fourth shape segment and an end point at a radial distance of 1.621±0.005 inches from the lasing medium cross section center point measured at an angle of 80.800° relative to said first axis;

a sixth reflector shape segment being a straight line having a start point coincident with the end point of said fifth shape segment and an end point at a radial distance of 1.565±0.005 inches from the lasing medium cross section center point measured at an angle of 90.000° relative to said first axis; and each angle measured relative to said first axis having a tolerance that is a function of the corresponding radial distance from the lasing medium cross section center point.

2. A reflector for use in a slab laser including a solid-state yttrium aluminum garnet lasing medium having a generally rectangular shape and cross section, said lasing medium having first and second opposing major face surfaces disposed parallel to each other and to a longitudinal axis extending through a center of the lasing medium rectangular cross section, a first axis intersecting said longitudinal axis at a lasing medium cross section center point and substantially bisecting a thickness of the lasing medium rectangular cross section, a second axis intersecting the lasing medium cross section center point and bisecting a width of the lasing medium rectangular cross section, said slab laser including a first and a second tubular krypton flash lamp respectively disposed adjacent said first and second lasing medium major face surfaces for impinging electromagnetic radiation thereon, a longitudinal lamp axis of each said first and second flash lamp being parallel to said lasing medium longitudinal axis and intersecting said second axis at points equidistant from the lasing medium cross section center point on opposite sides thereof, said lasing medium being positioned within an annular optically clear support tube coaxial with said lasing medium longitudinal axis such that a center of curvature of both an inside surface and an outside surface of said support tube is located at the lasing medium cross section center point, a first and a second optically clear filler each having a curved surface generally conforming to said support tube inside surface and a substantially flat surface, said first and second fillers being positioned within said support tube with their flat surfaces respectively parallel to said lasing medium first and second major surfaces, the curved surface of each said first and second filler being fastened to said support tube inside surface, a first cooling fluid channel being defined between said first filler flat surface and said lasing medium first major surface, a second cooling fluid channel being defined between said second filler flat surface and said lasing medium second major surface, a first and a second optically clear lasing medium support being respectively positioned between a first and a second side surface of said lasing medium and said support tube inside surface, said first and second flash lamps respectively being coaxially positioned within a first and a second flow tube to form a flash lamp cooling fluid channel between a flash lamp outer surface and a flow tube inner surface, said reflector surrounding said first and second flow tubes and said support tube, an inside surface of said reflector having a shape effective to introduce a positive focal power lens effect into a central portion of the lasing medium width, the positive lens effect having a magnitude approximately equal to a negative focal power lens effect experienced in lateral edge portions of said lasing medium, a cross section of the slab laser including said reflector inside surface being symmetrical about each said first and second axis, the lasing medium rectangular cross section having a width of 0.984±0.004 inches and a thickness of 0.244±0.002 inches, each said first and second filler having a thickness dimension of 0.424+0.000/−0.005 inches extending from its flat surface to its curved surface along said second axis, said first and second supports each having a thickness dimension substantially equal to that of said lasing medium and a width dimension of 0.122±0.002 inches as measured along said first axis, an inside and an outside diameter dimension of said support tube respectively being 1.252±0.002 inches and 1.442±0.002 inches, said lamp axis of each said flash lamp being 1.230±0.005 inches from the lasing medium cross section center point as measured along said second axis, a cross section of each said flash lamp having a nominal outside diameter and wall thickness of 10.0 mm and 1.0 mm respectively, said first and second flow tubes each respectively having an inside and an outside diameter of 0.496±0.001 inches and 0.591+0.010/−0.000 inches, the cross section of said reflector inside surface in a first quadrant of the slab laser cross section comprising:

a plurality of reflector shape segments each having a start point and an end point;

a first reflector shape segment being a straight line having a start point at a radial distance of 0.762±0.005 inches from the lasing medium cross section center point along said first axis and an end point at a radial distance of 0.883±0.005 inches from the lasing medium cross section center point measured at an angle of 15.479° relative to said first axis;

a second reflector shape segment being a straight line having a start point coincident with the end point of said first shape segment and an end point at a radial distance of 1.069±0.005 inches from the lasing medium cross section center point measured at an angle of 34.088° relative to said first axis;

a third reflector shape segment being a straight line having a start point coincident with the end point of said second shape segment and an end point at a radial distance of 1.245±0.005 inches from the lasing medium cross section center point measured at an angle of 47.247° relative to said first axis;

a fourth reflector shape segment being a straight line having a start point coincident with the end point of said third shape segment and an end point at a radial distance of 1.494±0.005 inches from the lasing medium cross section center point measured at an angle of 55.341° relative to said first axis;

a fifth reflector shape segment being a circular arc having a start point coincident with the end point of said fourth segment and a fifth segment center of curvature located on said second axis at a distance of 0.914±0.005 inches from the lasing medium cross section center point, a fifth segment radius of curvature being 0.906±0.005 inches, an end point of said fifth segment occurring at an angle of 45.000° measured from said fifth segment curvature center relative to a third axis extending from the last recited center and parallel to said first axis;

a sixth reflector shape segment being a circular arc having a start point coincident with the end point of said fifth segment and a sixth segment center of curvature located at a distance 0.315±0.005 inches measured along said first axis and a distance of 1.229±0.005 inches measured along said second axis, a sixth segment radius of curvature being 0.461±0.005 inches, an end point of said sixth segment occurring at said second axis; and each angle having a tolerance that is a function of its corresponding radial distance.

* * * * *